2,704,275
Patented Mar. 15, 1955

2,704,275

THIENYLTHIO-SUBSTITUTED ETHERS AND MINERAL OIL COMPOSITIONS CONTAINING THE SAME

John W. Brooks, Wenonah, N. J., assignor to Socony-Vacuum Oil Company, Incorporated, a corporation of New York No Drawing. Application August 31, 1950,
Serial No. 182,640

13 Claims. (Cl. 252—45)

This invention relates to a new class of chemical compounds and to mineral lubricating oil compositions containing the same. More particularly, the invention relates to thienylthio-substituted ethers and to mineral oil compositions containing these compounds as oxidation and corrosion inhibitors.

As is well known, mineral lubricating oils tend to decompose, especially under heat and oxidizing conditions, such as those encountered in use in internal combustion engines. The decomposition products formed in the oil are acidic in nature and exert a corrosive action upon the metal surfaces being lubricated. The present invention is concerned with a novel class of chemical compounds which are highly effective in counteracting this tendency of an oil to decompose and thus harm the metal surfaces.

In accordance with this invention, it has been found that thienylthio-substituted ethers are excellent addition agents for stabilizing mineral lubricating oils against the deleterious effects of oxidation. It is, therefore, the primary object of this invention to provide lubricating oil compositions containing these new antioxidant compounds. Other and further objects will become apparent as the description of the invention proceeds.

The thienylthio-substituted ethers of the invention are prepared by reacting a thiophenethiol, such as 2-thiophenethiol or 3-thiophenethiol, with a chlorinated ether. The chlorinated ethers contemplated herein are those in which the chlorine atoms are attached to aliphatic carbon atoms rather than to aromatic or heterocyclic carbon atoms, although the ethers contemplated may suitably contain a substituent group of this latter character.

The chlorinated ether may contain one or more, generally from one to about six, chlorine atoms capable of being substituted by the thienylthio groups to form mono- or polythienylthio-substituted products. The chlorine atoms may suitably appear on one or on both of the radicals attached to the ether group, which group in turn may be either an oxygen atom or a sulfur atom.

As non-limiting examples of the chlorinated ethers contemplated herein, there may be mentioned the following:

Alpha,alpha'-dichloroethyl ether
Beta,beta'-dichloroethyl ether
Gamma,gamma'-dichloropropyl ether
Beta,beta'-dichloroethyl sulfide
Beta,beta'-dichloroisopropyl ether
Alpha,alpha',beta,beta'-tetrachloroethyl ether
Zeta,zeta'-dichloro,alpha-phenyl dihexyl ether
Theta,theta'-dichloro,alpha-thienyl octyl sulfide
Pi-chlorohexadecyl,theta'-chlorooctyl ether
Mu,mu'-dichlorododecyl ether
Alpha-chloromethyl ether
Alpha-phenyl,alpha-chloromethyl ether
Alpha,alpha-dichoromethyl phenyl ether
Alpha,beta-dichloromethyl ether
Delta,delta-dichlorobutyl cyclohexyl ether
Alpha-chloromethyl sulfide
Epsilon,epsilon-dichloroamyl ether
Theta-chlorooctyl dodecyl ether
Mu-chlorododecyl sulfide
Theta-chlorooctyl hexadecyl ether The reaction between the chlorinated ether and the thiophenethiol is readily carried out by heating the reactants together at moderately elevated temperatures, i. e. from about 50° C. to about 100° C. for a time sufficient to complete the reaction, i. e. from about 1 to about 10 hours, in the presence of an alkaline material, such as potassium hydroxide.

Generally, the amount of thiophenethiol and chlorinated ether used in the reaction are such that sufficient thiophenethiol is present to replace each of the chlorine atoms present in the chlorinated ether. Thus, for a monochlorinated ether, approximately one mol of thiophenethiol is used per mol of the ether, whereas with a dichlorinated ether two mols of thiophenethiol is generally used. However, particularly with the polyhalogenated ethers, complete substitution of the chlorine atoms of the ether is not necessary for the obtainment of products useful as oil additives.

The following equation is typical of the reactions which take place between the chloroethers herein contemplated and thiophenethiol

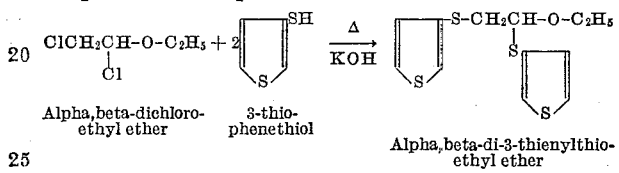

Alpha,beta-dichloro-ethyl ether    3-thio-phenethiol    Alpha,beta-di-3-thienylthio-ethyl ether The thienylthio-substituted ether compounds particularly contemplated by the invention will conform to one of the following general formulae, depending on whether the chlorine atoms appear (a) on both radicals attached to the ether radical or (b) on only one of said radicals of the starting ether.

(a) 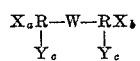

and (b) 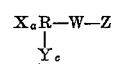

wherein X represents a thienylthio radical, R represents an aliphatic hydrocarbon residue, Y represents a radical selected from the group consisting of hydrogen, alkyl, aryl and heterocyclic radicals, W is selected from the group consisting of oxygen and sulfur atoms, Z is selected from the group consisting of alkyl, aryl and heterocyclic radicals, and $a$ and $b$ are integers from 1 to 6, whose total does not exceed 6, $c$ is an integer from 1 to 3; the total number of aliphatic carbon atoms in any one compound not exceeding about 24.

As illustrative examples of the thienylthio ethers contemplated by the invention, there may be mentioned the following:

TYPE (a)

Alpha,alpha'-dithienylthiomethyl ether
Beta,beta'-dithienylthioethyl ether
Gamma,gamma'-dithienylthiopropyl ether
Beta,beta'-dithienylthioethyl sulfide
Beta,beta'-dithienylthioisopropyl ether
Alpha,alpha', beta,beta'-tetrathienylthioethyl ether
Zeta,zeta'-dithienylthio-alpha-phenylhexyl ether
Theta,theta'-dithienylthio-alpha-thienyloctyl sulfide
Pi-thienylthiohexadecyl, theta-thienylthiooctyl ether
Mu,mu'-dithienylthiododecyl ether

TYPE (b)

Alpha,thienylthiomethyl ether
Alpha,alpha-thienylthiophenylmethyl ether
Alpha-thienylthiomethyl sulfide
Alpha,alpha-dithienylthiomethyl phenyl ether
Alpha,beta-dithienylthioethyl ether
Delta,delta-dithienylthiobutyl cyclohexyl ether
Epsilon,epsilon-dithienylthioamyl ether
Theta,thienylthiooctyl dodecyl ether
Mu-thienylthiododecyl sulfide
Theta-thienylthiooctyl hexadecyl ether To illustrate in further detail the manner in which the products contemplated by this invention are prepared the following example is given.

EXAMPLE I

Preparation of alpha,beta-di-3-thienylthioethyl ether

A mixture of 174 grams (1½ mols) of 3-thiophene-thiol and 84 grams (1½ mols) of KOH in 300 cc. of ethyl alcohol were placed in a flask. Ninety grams (⅝ mol) of alpha,beta-dichloroethyl ether were added at such a rate that the temperature remained around 45–50° C. After addition was complete, the reaction mixture was stirred for 5 hours at 75° C. The product was washed with water, aqueous NaOH solution, and again with water. Topped to a pot temperature of 100° C. at 1 mm. and then treated with superfiltrol to lighten the color. Sulfur analysis=39.16%. Theo. S.=42.40%.

EXAMPLES II–VIII

A number of other thienylthio-substituted ethers were prepared by the same general method employed in the foregoing example for the preparation of alpha,beta-di-3-thienylthioethyl ether. These examples are listed in Table I.

TABLE I

| Ex. No. | Material Reacted With 3-Thiophenethiol | Product | Appearance of Product | Sulfur Anal. Percent | Theo. S. Percent |
|---|---|---|---|---|---|
| II | Gamma, gamma'-dichloropropyl ether | Gamma,gamma'-di-3-thienylthiopropyl ether | Liquid | 44.06 | 38.81 |
| III | Beta,beta'-dichloroisopropyl ether | Beta,beta'-di-3-thienylthioisopropyl ether | do | 36.5 | 38.81 |
| IV | Triglycol dichloride | 2[2(3-thienylthio)ethoxy]2'-(3-thienylthio)diethyl ether | do | 36.74 | 37.21 |
| V | Beta-chloroethyl phenyl ether | Beta-3-thienylthioethyl phenyl ether | Gray Crystals M.P.=47–48° C. | 27.19 | 27.12 |
| VI | Alpha,alpha'-dichloromethyl ether | Alpha,alpha'-di-3-thienylthiomethyl ether | White Solid M.P.=40–41° C. | 46.44 | 46.73 |
| VII | Beta,beta'-dichloroethyl sulfide | Beta,beta'-di-3-thienylthioethyl sulfide | White Solid M.P.=53–55° C. | 49.97 | 50.31 |
| VIII | Beta,beta'-dichloroethyl ether | Beta,beta'-di-3-thienylthioethyl ether | White Solid M.P.=33° C. | 42.88 | 42.39 |

To demonstrate the effectiveness of the products of this invention as lubricating oil additives, several comparative tests were carried out on mineral lubricating oils alone and on these some oils blended with minor amounts of a number of typical thienylthio-substituted ethers.

German tar test

This test is designed to show the tendency of a lubricating oil to oxidize in use.

In this test, a sample of test oil (150 grams) is placed in a 250 ml. extraction flask equipped with a cork stopper and having a 6 mm. I. D. inlet tube extending through this stopper to the bottom of the flask. The flask also has a vent tube. The flask is placed in a constant temperature oil bath and maintained at a temperature of 120° C. throughout the test. Oxygen is passed through the oil via the inlet tube at the rate of two bubbles per second for 70 hours.

The extent of oxidation effected in the oil is reported in terms of the neutralization number (N. N.) thereof, as measured at the completion of the test. The higher the N. N. the greater the oxidation which took place, since the oxidized products formed in oil are known to be acidic in character. The results obtained with the blended oil are compared to the results obtained with the unblended oil in each case.

Table II shows the results obtained with the thienylthio ethers of the invention in this test. The oil used was a highly acid-refined coastal distillate having a Saybolt Universal viscosity of 69 seconds at 100° F.

TABLE II

| Agent Added | Percent Used | N. N. Value |
|---|---|---|
| None | | 18 |
| Beta,beta'-di-3-thienylthioethyl ether | 0.1 | 0.02 |
| Alpha,beta-di-3-thienylthioethyl ether | 0.1 | 0.05 |
| Gamma,gamma'-di-3-thienylthiopropyl ether | 0.1 | 0.05 |
| Beta,beta'-di-3-thienylthioisopropyl ether | 0.1 | 0.02 |
| 2[2(3-thienylthio)ethoxy]2'-(3-thienylthio)diethyl ether | 0.1 | 0.06 |
| Alpha,alpha'-di-3-thienylthiomethyl ether | 0.1 | 0.08 |
| Beta,beta'-di-3-thienylthioethyl sulfide | 0.1 | 0.05 |

The data in Table II clearly show the effectiveness of the thienylthioethers in inhibiting oxidation of the oil.

Bubble test

This test determines the effectiveness of an oil in preventing bearing corrosion. In this test, an accurately weighed quarter of a connecting rod bearing having a cadmium-silver alloy surface is placed in a 200 x 25 mm. test tube, together with 30 gms. of the test oil. A 5 mm. glass inlet tube drawn down to about 1 mm. I. D. for about 30 mm. at one end is placed in the tube. The test tube is placed in a constant temperature bath, maintained at 175° C. and air blown through the test oil at a rate of 2 liters per hour for 22 hours. The test piece is then removed and weighed. The results are reported in milligrams of bearing weight loss. The results obtained in this test with the compounds of the invention are shown in Table III. The oil used in these tests was an SAE–20 solvent-refined Pennsylvania neutral.

TABLE III

| Agent Added | Percent Used | Mg. Loss In Wt. |
|---|---|---|
| None | | 20 |
| Beta,beta'-di-3-thienylthioethyl ether | 0.12 | Nil |
| Alpha,beta-di-3-thienylthioethyl ether | 0.25 | Nil |
| Gamma,gamma'-di-3-thienylthiopropyl ether | 0.5 | 2 |
| Beta,beta'-di-3-thienylthioisopropyl ether | 0.5 | Nil |
| 2[2(3-thienylthio)ethoxy]2'-(3-thienylthio)diethyl ether | 0.25 | 3 |
| Beta-3-thienylthioethyl phenyl ether | 0.25 | 2 |
| Alpha,alpha'-di-3-thienylthiomethyl ether | 0.5 | 3 |
| Beta,beta'-di-3-thienylthioethyl sulfide | 0.25 | Nil |

The data in Table III demonstrate the ability of the thienylthio ethers to inhibit the normal corrosive action of the oil on the metal bearing surfaces.

Lauson engine test

Several other substituted ethers such as beta,beta'-diphenylthioethyl ether and beta,beta'-di-n-dodecylthioethyl ether were prepared and tested, along with the several thienylthio-substituted ethers, in a Lauson engine in order to compare these derivatives with the 3-thienylthio-substituted ethers in respect to their oil stabilizing characteristics. This test determines oil deterioration and also the corrosiveness of the oil in use. The test is conducted in a single cylinder, liquid-cooled Lauson engine having copper-lead bearings, the engine being operated for 100 hours (with inspection periods every 20 hours) at a speed of 1825 R. P. M., the oil temperature being maintained at approximately 270° F. and the jacket temperature at approximately 212° F. The results are reported in terms of milligrams of bearing weight loss and the neutralization number (N. N.) of the oil and viscosity increase of the oil during the run. These results are compared to the results in a similar run on the blank oil. The results obtained in these tests are shown in Table IV. The oil used in the tests was an SAE–20 solvent-refined Pennsylvania neutral.

TABLE IV.—LAUSON TEST RESULTS

| Compound Added to Oil | Conc., Percent | Bearing Wt. Loss (Gms.) | N. N. | Percent Vis. Inc. |
|---|---|---|---|---|
| None | | 0.500 | 4.7 | 38 |
| Beta,beta'-di-3-thienylthio-ethyl ether | 1 | 0.001 | 1.5 | 8 |
| Beta,beta'-di-3-thienylthio-ethyl sulfide | 1 | 0.024 | 2.6 | 21 |
| Beta,beta'-di-phenylthioethyl ether [1] | 1 | 0.340 | 5.4 | 54 |
| Beta,beta'-di-n-dodecylthio ethyl ether | 1 | 0.600 | 4.5 | |

[1] Results at the end of 60 hours. Test was stopped at this point because bearing weight loss was very high.

It can be seen from Table IV that the thienylthio ethers inhibit oxidation and corrosion much more effectively than other thio-substituted ethers.

The thienylthio ethers may be used in lubricating oils in amounts varying from about 0.1 per cent to about 10 per cent by weight, depending upon the particular application for which the oil is designed.

Concentrated solutions of the addition agents in oil are also contemplated herein, such solutions containing upwards of 10 per cent by weight and generally from about 25 to about 75 per cent, such solutions being suitable for marketing, since they provide a readily soluble form of the additives for blending with the oils utilized in preparing the final fortified oil compositions.

Although the thienylthio ethers have been shown herein to be effective antioxidant agents for addition to lubricating oils, it should be clear that they may also be utilized in other petroleum oil fractions in which antioxidant properties are desired, such as gasoline, fuel oils and heavy lubricants, such as greases, etc.

The compounds of the invention may be used in the lubricating oil, or other hydrocarbon fractions, in conjunction with other additives designed to improve the character of said fractions in different respects, such as pour depressants, viscosity index improvers, detergents, extreme pressure agents, etc.

Although the principles of this invention have been illustrated herein by means of certain specific examples and tests, it is not intended that the scope of the invention be limited thereby, but only as indicated in the following claims.

I claim:

1. A mineral lubricating oil containing a minor proportion, sufficient to stabilize said oil against oxidation, of the compound beta,beta'-di-3-thienylthioethyl ether.

2. A mineral lubricating oil containing a minor proportion, sufficient to stabilize said oil against oxidation, of the compound alpha,beta-di-3-thienylthioethyl ether.

3. A mineral lubricating oil containing a minor proportion, sufficient to stabilize said oil against oxidation, of the compound beta,beta'-di-3-thienylthioethyl sulfide.

4. A mineral lubricating oil containing a minor proportion, sufficient to stabilize said oil against oxidation, of the compound beta,beta'-di-3-thienylthioisopropyl ether.

5. A mineral lubricating oil containing a minor proportion, sufficient to stabilize said oil against oxidation, of the compound beta-3-thienylthioethyl phenyl ether.

6. The compound beta,beta' - di - 3 - thienylthioethyl ether.

7. The compound alpha,beta - di - 3 - thienylthioethyl ether.

8. The compound beta,beta'-di-3-thienylthioethyl sulfide.

9. The compound beta,beta' - di - 3 - thienylthioisopropyl ether.

10. The compound beta - 3 - thienylthioethyl phenyl ether.

11. A compound of the general formula selected from the group consisting of (a) $\quad X_nR—W—RX_n$ and (b) $\quad X_nR—W—Z$ wherein X represents an unsubstituted thienylthio group, R represents a lower alkyl radical having $n$ hydrogen atoms thereof substituted by X radicals, the X radical in each instance being attached through the thio-sulfur atom thereof to the radical R, W is selected from the group consisting of oxygen and sulphur atoms Z represents a hydrocarbon radical selected from lower alkyl and phenyl radicals, and $n$ represents an integer from 1 to 2.

12. A petroleum oil fraction containing a minor proportion, sufficient to stabilize said fraction against oxidation, of a compound of the general formula selected from the group consisting of (a) $\quad X_nR—W—RX_n$ and (b) $\quad X_nR—W—Z$ wherein X represents an unsubstituted thienylthio group, R represents a lower alkyl radical having $n$ hydrogen atoms thereof substituted by X radicals, the X radical in each instance being attached through the thio-sulfur atom thereof to the radical R, W is selected from the group consisting of oxygen and sulphur atoms Z represents a hydrocarbon radical selected from lower alkyl and phenyl radicals, and $n$ represents an integer from 1 to 2.

13. A mineral lubricating oil containing a minor proportion, sufficient to stabilize said oil against oxidation, of a compound of the general formula selected from the group consisting of (a) $\quad X_nR—W—RX_n$ and (b) $\quad X_nR—W—Z$ wherein X represents an unsubstituted thienylthio group, R represents a lower alkyl radical having $n$ hydrogen atoms thereof substituted by X radicals, the X radical in each instance being attached through the thio-sulfur atom thereof to the radical R, W is selected from the group consisting of oxygen and sulphur atoms Z represents a hydrocarbon radical selected from lower alkyl and phenyl radicals, and $n$ represents an integer from 1 to 2.

References Cited in the file of this patent

UNITED STATES PATENTS

| | | |
|---|---|---|
| 2,479,513 | Richter et al. | Aug. 16, 1949 |
| 2,497,145 | Terry et al. | Feb. 14, 1950 |
| 2,528,773 | Norris | Nov. 7, 1950 |
| 2,533,798 | Hartough et al. | Dec. 12, 1950 |
| 2,540,093 | Brooks | Feb. 6, 1951 |
| 2,561,780 | Brooks | July 24, 1951 |
| 2,581,626 | Brooks | Jan. 8, 1952 |